United States Patent [19]
Ahrens

[11] Patent Number: 5,968,257
[45] Date of Patent: Oct. 19, 1999

[54] ULTRAFINE CEMENTITIOUS GROUT

[75] Inventor: Ernst H. Ahrens, Albuquerque, N.Mex.

[73] Assignee: Sandia Corporation, Albuquerque, N.Mex.

[21] Appl. No.: 09/007,715

[22] Filed: Jan. 15, 1998

Related U.S. Application Data

[63] Continuation-in-part of application No. 08/707,931, Sep. 10, 1996, Pat. No. 5,776,244, which is a continuation-in-part of application No. 08/297,351, Aug. 29, 1994, abandoned.

[51] Int. Cl.$^6$ .............................. C04B 14/16; C04B 24/16
[52] U.S. Cl. ......................... 106/737; 106/672; 106/678; 106/724; 106/725; 106/726; 106/809; 106/816; 106/819; 106/823
[58] Field of Search ..................................... 106/672, 676, 106/677, 678, 724, 725, 726, 737, 809, 816, 819, 823, 708

[56] References Cited

U.S. PATENT DOCUMENTS

| | | | |
|---|---|---|---|
| 4,131,480 | 12/1978 | McCurrich et al. | 106/708 |
| 5,626,954 | 5/1997 | Anderson et al. | 106/675 |
| 5,641,584 | 6/1997 | Anderson et al. | 106/675 |
| 5,776,244 | 7/1998 | Ahrens | 106/737 |

*Primary Examiner*—Michael Marcheschi

[57] ABSTRACT

An ultrafine cementitious grout in three particle grades containing Portland cement, pumice as a pozzolanic material and superplasticizer in the amounts of about 30 wt. % to about 70 wt. % Portland cement; from about 30 wt. % to about 70 wt. % pumice containing at least 70% amorphous silicon dioxide; and from 1.2 wt. % to about 5.0 wt. % superplasticizer. The superplasticizer is dispersed in the mixing water prior to the addition of dry grout and the W/CM ratio is about 0.4 to 1/1. The grout has very high strength and very low permeability with good workability. The ultrafine particle sizes allow for sealing of microfractures below 10 $\mu$m in width.

16 Claims, 4 Drawing Sheets

ULTRAFINE CEMENTITIOUS GROUT

This application is a continuation-in-part of application Ser. No. 08/707,931 filed Sep. 10, 1996, U.S. Pat. No. 5,776,244. Application Ser. No. 08/707,931 was in turn a continuation-in-part of application Ser. No. 08/297,351, filed Aug. 29, 1994, now abandoned.

GOVERNMENT RIGHTS

This invention was made with Government support under Contract DE-AC04-94AL85000 awarded by the U.S. Department of Energy. The Government has certain rights in this invention.

BACKGROUND OF THE INVENTION

1. Field of the Invention (Technical Field)

The invention relates to ultrafine cementitious grouts, particularly ultrafine cementitious grouts suitable for sealing microfractures in rock.

2. Background Art

Grouts are widely used in the construction and mining industries. The most commonly encountered grout is the thin mortar used to fill cracks and crevices in masonry. Grouts used in common residential and commercial construction consist generally of mortars of sand and cement. Where finer grouting is required, such as in decorative or waterproof tile installation, grouts composed of finer sands and plasters are utilized.

Grouts are used in the mining industry to seal fractured rock. The grouts utilized in ordinary mining are similar to those used in masonry construction, and sometimes include sand. As mining becomes more sophisticated, and as artificial subterranean repositories become increasingly attractive alternatives to aboveground storage of nuclear and other hazardous wastes, the importance of sealing microfractures (cracks whose aperture is 100 microns ($100 \mu m$) or less) has increased. Extremely small fissures and cracks in repository walls must be reliably closed against the transmission or migration of hazardous fluids and gases.

A principal obstacle to reliable sealing of microfractures with cementitious grouts is the production of grouts with sufficiently small particles. Conventional understanding is that the successful permeation of a fracture with a particle-containing grout requires that the maximum particle dimension should not exceed one-third of the fracture aperture. As a result, ordinary cementitious grouts known in the art contain unacceptably large particle diameters to effectively enter and seal microfractures.

The need to seal microfractures and silty (fine grained) soil, has lead to the use of chemical grouts, such as polyacrylamide and polyacrylate, which are injected as liquids containing no particles. Because they are low-viscosity liquids when applied, chemical grouts adequately penetrate and seal microfractures. The chemical or so-called solution grouts, however, have become undesirable from environmental and worker safety standpoints. Polyacrylamides are known neurotoxins and suspected carcinogens. Polyacrylates can cause serious burns to the skin and mucous membranes. The use of polyacrylamides has been banned, and many manufacturers are phasing out the production of polyacrylates. Moreover, the degradation testing required to demonstrate the longevity of chemical grouts is time-consuming and imprecise; long-term reliability, however, is essential for grout sealing hazardous or nuclear waste repositories.

Interest has recently increased in the US in the use of cementitious grouts to seal microfractures. The most important parameter for evaluating the quality and effectiveness of cementitious grouts is particle size. Portland cements with 90% of the particles smaller than about 10 $\mu$ms, and slag microfines with 90% of the particles smaller than 8.4 $\mu$ms, have been developed, with the slag composed of the fine grained "dust" which accumulates on precipitation units in the exhaust stacks of steel mills. Some commercially available microfine grouts, however, have mixing instructions which specify large quantities of water (high water to cementitious materials ratios). The amount of water required in these microfine cementitious grout mixes causes undesirable results such as bleed (water separating from the grout as it hardens), reduced unconfined uniaxial compressive strength, and increased permeability.

U.S. Pat. No. 5,346,012 to Heathman and Crook for Fine Particle Size Cement Compositions and Methods describes a microfine grout comprising fine grained Portland cement and fly ash, both with a maximum particle size of about 10 microns, mixed to a water to cementitious material (W/CM) ratio of about 0.7 to about 2.8, preferably 0.9 to 1.3. The fly ash was chiefly $SiO_2$ (54%) and $Al_2O_3$ (30%) with minor amounts of other minerals. Recommended additives include superplasitcizer (up to about 3%), and fluid loss control additive (up to about 3%). This reference suggests that the relatively high water content of its preferred mixture can produce grout compositions of low density and low viscosity without unsatisfactory loss in strength, which Applicants' studies refute. No mention is made of the permeability or bleed characteristics of the grout mixture or how it can be prepared.

Unfortunately, neither the slag based grouts or the fly ash based grouts have exhibited the performance necessary for many applications. These performance requirements include the ability to seal fractures in the 10 $\mu$m size range, essentially zero bleed, essentially zero porosity and permeability, controlled set time, and reasonable cost.

The grouts that use slag as the pozzolanic component exhibit less compressive strength, have relatively large particle size, and some require additional lime additives. The grout disclosed in U.S. Pat. No. 5,346,012 also has relatively large particle size (no greater than 30 microns as specified in the examples), and requires relatively high water content to attain injectability which result in lower compressive strength, water 'bleed' during crystallization that leaves channels of interconnected porosity ('wormholes'), and an undesirable lower density. Although it is clear that grouts with smaller particle sizes are better able to seal the smallest microfractures, no reference provides guidance as to which constituents may be successfully employed in the ultrafine particle size regime (less than about 5 $\mu$m), in what ratios one to another, optimal W/CM ratios, or even how the ultrafine grout mixtures can be manufactured.

Consequently, an unmet need remains for a microfine, cementitious grout for use in sealing microfractures, which is easily worked when wet and results in a grout seal having high strength, low permeability and zero bleed.

SUMMARY OF THE INVENTION

The invention relates to ultrafine cementitious grout compositions and methods of making and using them. A preferred composition of the invention consists of a mixture of cementitious materials, the mixture being made by combining from about 30 to about 70 weight percent of a Type 5 Portland cement, from about 70 down to about 60 weight percent of pumice 25 pozzolanic material, and up to about 5.0 weight percent superplasticizer, with 90 percent of the composition particles being smaller than 5 μm in diameter. The combination of cementitious materials is mixed with water in water-to-cementitious materials ratio between about 0.40/1 and 1.00/1. Various specific embodiments of the invention include the preferred use of ASTM Type 5 Portland cement, ASTM Type 3 Portland cement and particular superplasticizers.

In another preferred composition the invention consists of a mixture of cementitious materials (made by combining pumice, Type 3 Portland Cement and a superplasticizer) using pumice pozzolanic material varying from about 30 to about 70 weight percent (of the combined pumice and cement), with Type 3 Portland Cement making up the remainder to 100 weight percent of the pumice and cement mixture. Superplasticizer content in this composition varies from 1.4 to 5 weight percent of the combined cement and pumice. At least three different grades of this material can be manufactured including a premium grade having 90 percent of the composition particles smaller than 5 μm in diameter (with an average diameter of about 2.5 μm), a medium grade having 90 percent of the composition particles smaller than 8 μm in diameter (with an average diameter of 4 μm), and a construction grade having 90 percent of the composition particles smaller than 17 μm in diameter (with and average diameter of about 8 μm).

The methods of making the foregoing compositions of the invention, whereby high-speed attritor apparatuses and specialized pulverization media are used to produce a grout composition having 90% of particle diameters less than 5 μm are of primary importance and also disclosed herein. The method of making the grout includes both dry and wet pulverization processes, where the grout may be pulverized dry for later wetting, or can simultaneously be pulverized and mixed with water for immediate use. The dry grout mix, or wet grout paste, have practical use especially for sealing microfractures in rock, "squeeze" cementing in the petroleum industry, repairing concrete structures, improving the bearing capacity of sandy soils and limiting the migration of contaminants in environmental remediation.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

This invention relates to ultrafine cementitious grouts. Most particularly, the invention relates to an ultrafine cementitious grout suitable for reliably sealing microfractures in rock walls of subterranean mines and chambers against the leakage of radioactive or hazardous waste-bearing water and/or gases. Additional potential applications of the invention include the strengthening of weak soils, whereby the composition of the invention is used to increase the bearing capacity of soils at construction sites (and to prevent liquefaction in case of an earthquake). Its use will also facilitate the construction of very low permeability subsurface grout curtains and walls, and to repair cracked dams.

The grout of this invention has a unique combination of components at particle sizes below those disclosed in the art and exhibits properties that are a significant improvement over prior grouts. This grout has successfully entered and sealed 6 micron fractures and, in one measured instance, sealed a 3 micron fracture. Penetration in microfractures as small as 6 microns was found to exceed 3 meters. The unconfined, uniaxial compressive strength is 6.2 MPa (899 psi) one day after injection, increasing to 39.9 MPa (5785 psi) after 28 days. The grout has essentially no permeability and is self healing in the event of a fracture. No water separates from the grout during hardening (zero bleed) at w/c of 1/1. The setting time of the grout is adjustable from about 2 hours to about 6.5 hours with a minimum of one hour of good workability. Further development may increase these boundaries.

The ultrafine particle sizes and unique combination of Portland cement and amorphous silicon dioxide produce these superior operating parameters. The ultrafine particle sizes enable the superior penetration characteristics of this grout and also enhance the beneficial chemical interaction between the Portland cement and the amorphous silica in pumice due to the increased surface area of the ultrafine particles. The chemical interactions between the two main constituents successfully combat the main degradation mechanism for cementitious grouts. With ordinary cementitious grouts there is always some permeability. Water from external sources or bleed water produced during hardening collects on the exterior surfaces of the grout and in the interconnected porous spaces in the grout and begins to dissolve the Portlandite phase (calcium hydroxide) of the grout. This produces an excess of calcium and hydroxyl ions in solution. Mass transfer drives these ions from areas of high concentration to areas of low concentration. This predominately means that the ions exit the external interface between the grout and the host rock, degrading this interface and creating a fluid pathway through the grouted rock. The grout of this invention employs the high amorphous silicon dioxide content pumice to prevent this chemical reaction from occurring. The amorphous silicon dioxide reacts with the calcium and hydroxyl ions in the fluid grout to form calcium tri-silicate (replacing the Portlandite) which has very low solubility. The relatively high fraction of pumice pozzolan decreases the relative amount of Portland cement, thereby reducing hydrational heat during hardening. The ultrafine pozzolan also results in smaller pores in the grout (average diameter is one micron) and causes the pores to be more disconnected as evidenced by mercury porosimetry and the extremely low hydraulic conductivity exhibited by this grout.

It is generally accepted in the art that thorough grouting of a microfracture requires the use of a grout whose maximum particle size does not exceed approximately one-third the size of the fracture aperture. Larger particles in any significant quantity interlock ("bridge") at the entrance point and prevent the grout from permeating and sealing the fracture.

The permeability and strength of hardened grout depend in part upon the degree of hydration, the temperature reached during hydration reactions, the degree to which hydrated calcium silicate phases replace the most soluble phase of the hardened grout, which is calcium hydroxide, and the ability of hydration of the grout to consume all of the water. These factors also affect the chemical stability and permeability of the hardened product (the latter is partially a function of the grout's degree of microcracking, which in part results from thermo-mechanical strain induced during curing). For a grout to meet the physical and chemical requirements for a particular application, the mix is optimized by examining the effects upon material properties of variations in type of cement, the weight ratio of water to cementitious materials (W/CM), and the types and quantity of additives. For purposes of this disclosure and claims, "cementitious materials" means Portland cement powders, pumice pozzolanic material, and optional cement additives such as plasticizers. A single adjustment in the quantity and/or type of any one of these ingredients tends to affect more than one mechanical property in the final grout.

The present invention provides an ultrafine cementitious grout that is suitable for sealing microfractures in substances, particularly hard rock. For purposes of this disclosure, "ultrafine" means a grout mix having 90% of particle diameters less than 5 $\mu$m. The composition of the invention meets the criteria, such as suitable rheology when wet and compressive strength and low permeability when hard, required for reliable long-term sealing of subterranean rock, e.g. of hazardous or nuclear waste repositories or sealing of tunnel walls.

The pulverization of cementitious material to achieve the required maximum particle size in the grout mix is a complex process. Pulverization may be performed either "wet" or "dry." Dry pulverization is the preferred process and involves continuous processing of the various quantities of cement and pozzolanic material. The dry mix may then be bagged and stored for later transportation to the site of use. On site, the dry grout is mixed with a prescribed quantity of water and superplasticizer for use. Wet pulverization involves the simultaneous batch pulverization and mixing, at the job site, of the complete grout mix, wherein the pulverization process is performed in presence of water (in the amount prescribed for the complete grout mixture). The proportional quantities of grout mix components are substantially the same for dry and wet pulverization, but pulverization times and apparatuses differ between the two methods. Attention to the type of milling apparatus (including pulverization media) employed, the grinding rate and duration, and the precise compositional formula, results in a suitable ultrafine grout composition. Effective limits and optimums have been determined for, among other variables: the type and weight percent of cement; the ratio, by weight, of water to cement; the weight percent of pumice pozzolanic material; the type and weight percent of superplasticizer; the diameter and composition of the satellites (small grinding balls) in the attritor; the rotational speed of the attritor and the pulverization retention time in the attritor.

The ultrafine grout components of the invention are pulverized in attritors. The wet pulverization process preferably utilizes a "batch" attritor, while dry grout preferably is pulverized in a continuous feed high-speed attritor (HSA). Attritors function to produce powders, primarily by agitating pulverization media together with the materials to be pulverized in a stationary vertical tank. The use of an HSA permits the achievement of the very small maximum particle dimensions required for effective grout sealing of microfractures. Attritors are used in the food, paint, rubber, pharmaceutical and ceramic industries, but are not known to have been used previously to manufacture grout. Preferably, the method of the invention is performed using a SZEGVARI® Attritor Model HSA-100, manufactured by Union Process, Inc. Suitable alternatives may be engaged to accommodate batch sizes, power availability, and the like. Attritors such as the SZEGVARI® Attritor Model HSA-100 reduce particle size much faster than standard ball mills and are much more energy efficient.

Figure 1:
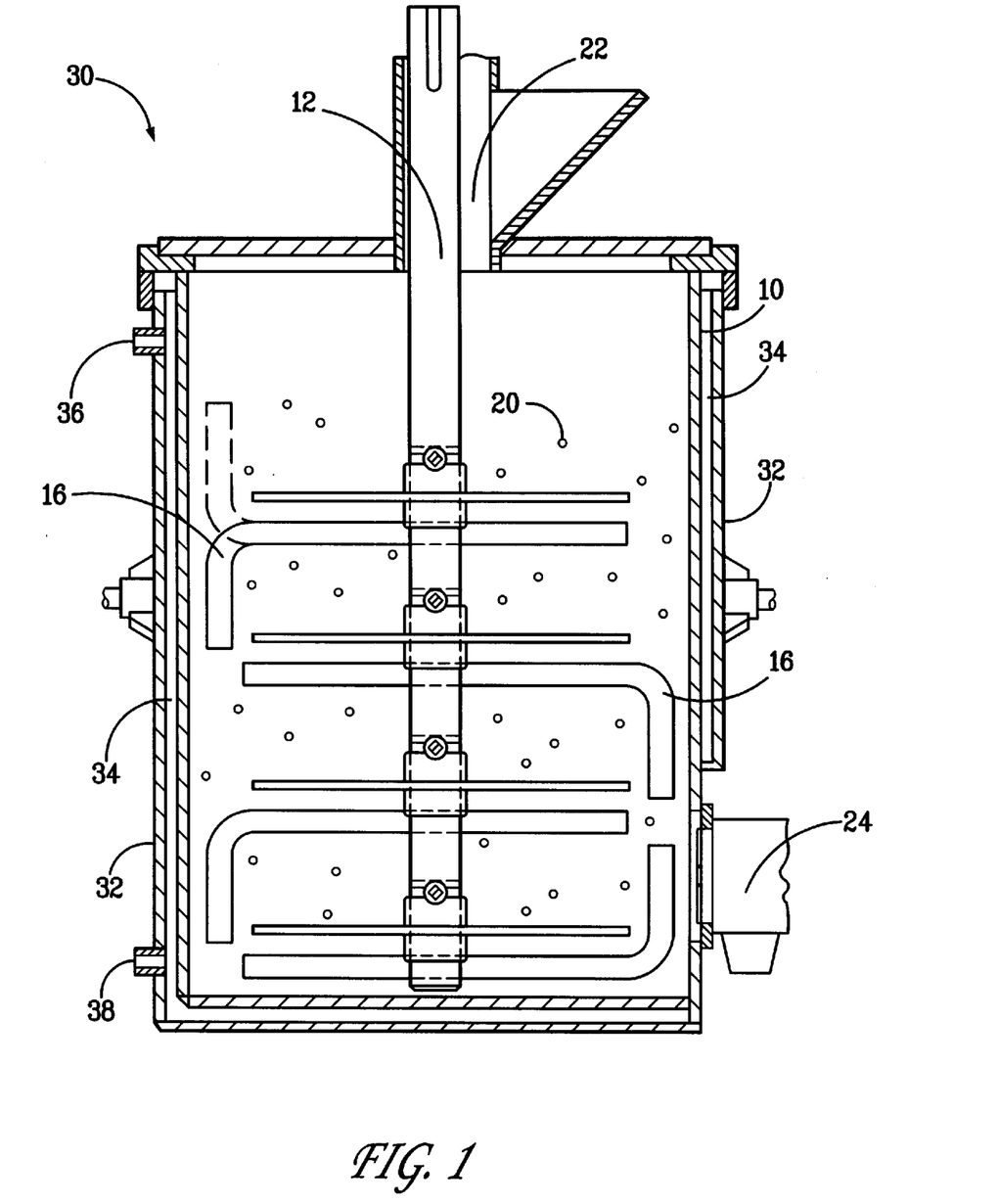
FIG. 1 is a cross-sectional side view of a high-speed continuous feed attritor utilized in the invention.

A typical continuous-feed attritor apparatus is depicted in FIG. 1. The attritor 30 comprises a vertical steel (e.g. 316 stainless steel) tank 10, open or closed at the top. Extending downward into tank 10 is vertical shaft 12 equipped with a plurality (e.g. six) of cross-arms 16 of durable composition such as tungsten carbide. Pulverization media 20 (i.e. very hard spheres, partial number shown) are densely stacked in tank 10 to level just covering the upper cross-arm 16 when the machine is at rest. An electric or other motor rotates shaft 12, causing cross-arms 16,16' to move through pulverization media 20, imparting random motion to the media spheres. Pulverization of material within tank 10 results from impact and shear effects between individual media spheres. Materials may be added to tank 10 via materials inlet 22, and extracted from the tank 10 via outlet 24, using pumps or augers (not shown) known in the art, or otherwise.

Acceptable pulverization media 20 include 2 mm-diameter (preferred), 3 mm-diameter, and 6 mm-diameter zirconium oxide spheres, as well as 3 mm-diameter carbon steel spheres and 3 mm-diameter, 440C, 316 stainless steel spheres. For dry pulverization, the pulverization media 20 preferably comprises 2 mm-diameter zirconium silicate spheres, based upon demonstrated milling performance (including the need to avoid mixture sticking, caking, and agglomeration), specific gravity, cost, and longevity. Wet pulverization preferably employs zirconium oxide spheres, although desirable milling performance may be achieved using less expensive 3 millimeter 316 stainless steel spheres.

For dry pulverization, the various dry ingredients of the composition are pulverized and mixed in an HSA attritor 30, from which they are removed after pulverization to an average particle size of 2.5 microns (2.55 $\mu$m). Preferably, the retention time of the mix within a SZEGVARI® continuous feed 100-HSA attritor 30 is between approximately four minutes and six minutes, at 390 to 400 RPM. The throughput under these preferred conditions is approximately 750 lb./hr. The dry ingredients then pass through an air classification unit where the product (particle size 90% smaller than 5 $\mu$m) is split off and packaged. The oversize is returned to the HSA attritor in a closed circuit. Attrition of dry components preferably is performed in a low humidity environment, as ultrafine cementitious materials are highly hydrophilic and absorption and adsorption of ambient water vapor may impair the quality and performance of the dry mixture. During the pulverization, the HSA attritor operates at approximately 250° F. to 350° F., which drives off moisture. For the same reason, the final dry mix is hermetically sealed as produced in waterproof containers for storage and transportation.

To perform the dry pulverization process of the invention, a continuous feed high speed attritor HSA-100 30 is used to pulverize the solid grout components. Pumice (preferably minus 325 mesh) is utilized as a grinding aid and pozzolan. An inadequate amount of pumice in the dry mix undesirably results in the generated fines agglomerating and sticking to the pulverization media 20 and to the interior of the attritor tank 10 itself. The preferred pulverization media 20 for dry pulverization is 2 mm-diameter zirconium silicate spheres.

Figure 3:
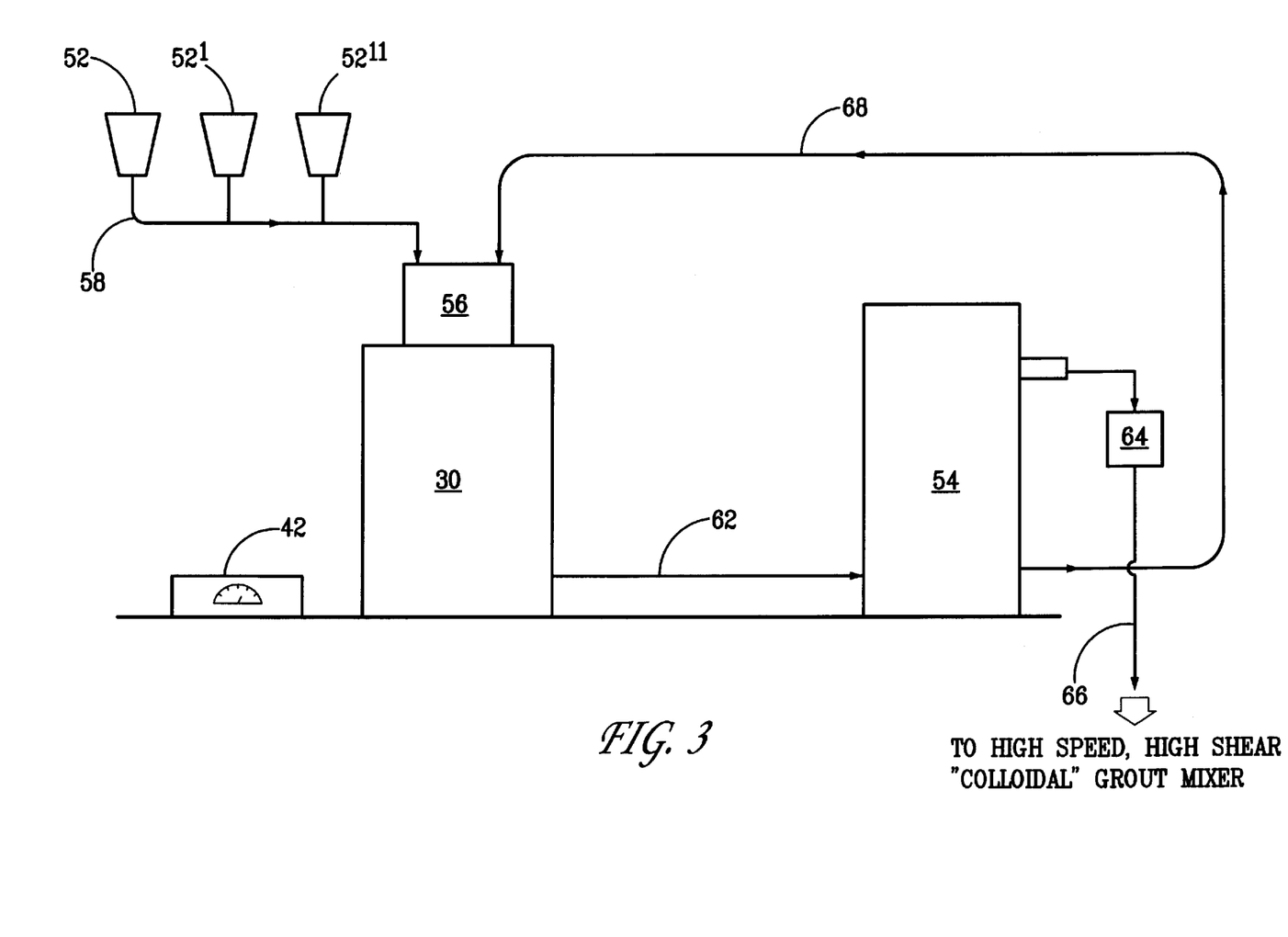
FIG. 3 is a schematic diagram depicting the process and apparatus for production of dry pulverized grout according to the invention.

Reference is made to FIG. 3, showing the use of attritor 30 to make ultrafine cementitious grout according to the dry pulverization method of the invention. Commercially available electronically controlled, loss-in-weight feeders 52,52' and 52" are used to feed the dry mix components into hopper 56, in the precise weight percents prescribed. Transportation of dry mix components from materials feeders 52,52' and 52" to hopper 56 is via screw or auger conveyor 58 or acceptable equivalent. Dry mix components are then dropped from hopper 56 into attritor 30. Pulverization occurs in attritor 30, where mechanically derived heat (250°–350° F.) ameliorates the hygroscopic character of the dry mix.

Dry pulverization involves the use of an air classification unit 54 for reliably consistent size separation of dry mix particles. Air classification unit 54 functions to evaluate and physically separate ultrafine dry mixes according to particle size. An acceptable air classification unit for practicing the invention is the Model MS-5 air classification unit manufactured by Progressive Industries, Inc., Sylacauga, Ala.

Dry grout mix components are added to the attritor 30 in the proportions hereinafter specified, preferably using loss-in-weight materials feeders 52,52' and 52". The dry mix components are proportioned, by weight: Between about 40 weight percent to about 50 weight percent ASTM Type 5 sulfate-resistant Portland cement; between about 50 weight percent to about 60 weight percent pumice; and up to about 2.0 weight percent superplasticizer. The preferred proportional amounts are: 45 (±3) weight percent ASTM Type 5 sulfate-resistant Portland cement; 55 (±3) weight percent pumice (minus 325 mesh); and 1.0 (±1) weight percent superplasticizer (Dowell Schlumberger D-65c or equivalent). In an alternate formulation, between about 30 weight percent to about 60 weight percent of pumice and between about 70 weight percent to about 40 weight percent of ASTM Type 3 Portland cement is used with 1.4 to 5 weight percent superplasticizer.

The dry pulverized output of the attritor 30 is conveyed by auger or other conveyor 62 to air classification unit 54. The pulverized output is passed through air classification unit 54 where the portion (about 40%) of the pulverized and mixed output from the attritor that is smaller than 5 μm is segregated and physically removed and immediately hermetically packaged as finished product. A Laser Particle Size Analyzer 42, such as the Malvern Model 3200E MASTERCIZER® laser particle size analyzer from Malvern Instruments, Ltd., may be used for monitoring the particle size and percent distribution thereof of the output from the classification unit 54.

Figure 4:
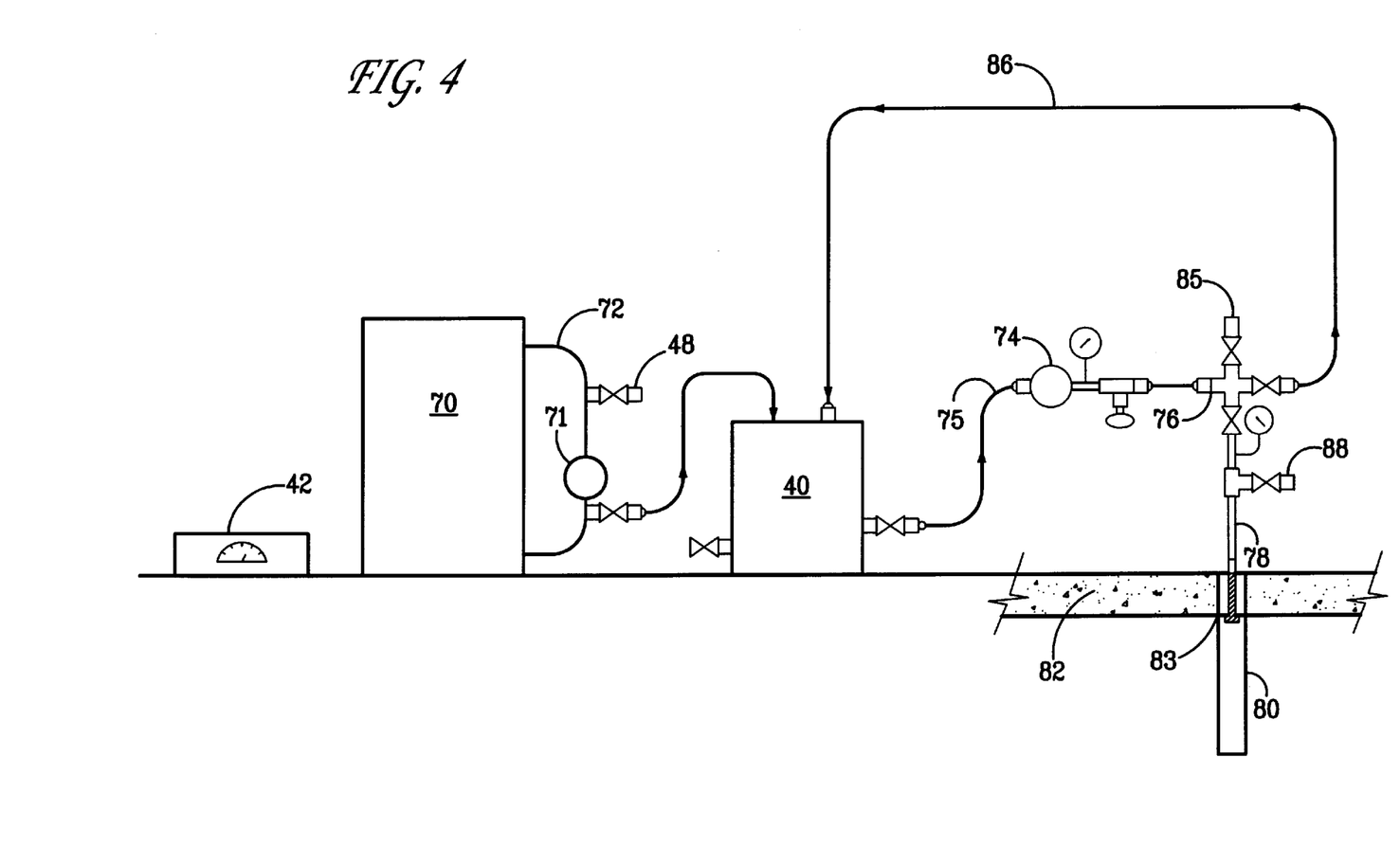
FIG. 4 is a schematic view of the grout injection system according to the invention.

The removed finished product may be conveyed to a container 64, from which it is removed for packaged storage or for further immediate on-site use. Further on-site use may involve conveying the product via conveyor 66 to a grout mixer (FIG. 4). Oversized material (e.g., >5 μm) is not removed by air classification unit 54, but rather is returned, by screw or other conveyor 68 in a closed-circuit configuration, as the preferential feed to attritor 30 for further pulverization. Passage, or multiple passages, of the mix through attritor 30 and the air classification unit 54 reliably produces a dry grout mix composition containing particles 90% smaller than 5 μm. The final product may be immediately mixed with water and used, or may be hermetically packaged against ambient humidity for transportation to the mixing site.

Additionally, for quality control, an energy dispersive X-ray fluorescence unit may be utilized to compare the main mill feed with the oversize after the pulverized grout has passed over two air classification units. This is desirable because the air classifications steps can split off slightly more cement than pozzolan, thereby potentially changing the formulation. The use of the X-ray permits adjustment of the cement feeder to maintain the correct proportion of cement in the grout.

The forgoing process creates a dry grout mix with 90% of particles smaller than 5 μm. When mixed with clean tap water in the proper water-to-cementitious materials ratio, the grout mix produced according to this process results in a grout with zero bleed, a uniaxial compressive strength greater than 5,800 psi at 28 days, and a hardened permeability of $1 \times 10^{-21}$ m$^2$ or less. The W/CM weight ratio is less than or equal to 0.70/1, preferably between 0.40/1 to 0.60/1, inclusive, and most preferably 0.5/1. Lower W/CM ratios reduce workability, but increase strength and decrease permeability.

Reference is made to FIG. 4. The on-site mixing of the dry mix and the prescribed amount of water is performed in a mixer 70, which is a high-speed, high-shear "colloidal" type grout mixer. Machines sold under the COLCRETE name work well. The feed for mixer 70 may include the on-site output from the container 64, or bagged dry product imported from off-site, typically handled as 50 pound bags. Water is added in the prescribed proportion to the mixer 70, the superplasticizer is added to the water and then the dry grout is added. The wet ingredients are thoroughly mixed (two to three minutes), and then transferred by circulation pump 71 to an agitation tank 40 from which the wet grout is dispensed.

Figure 2:
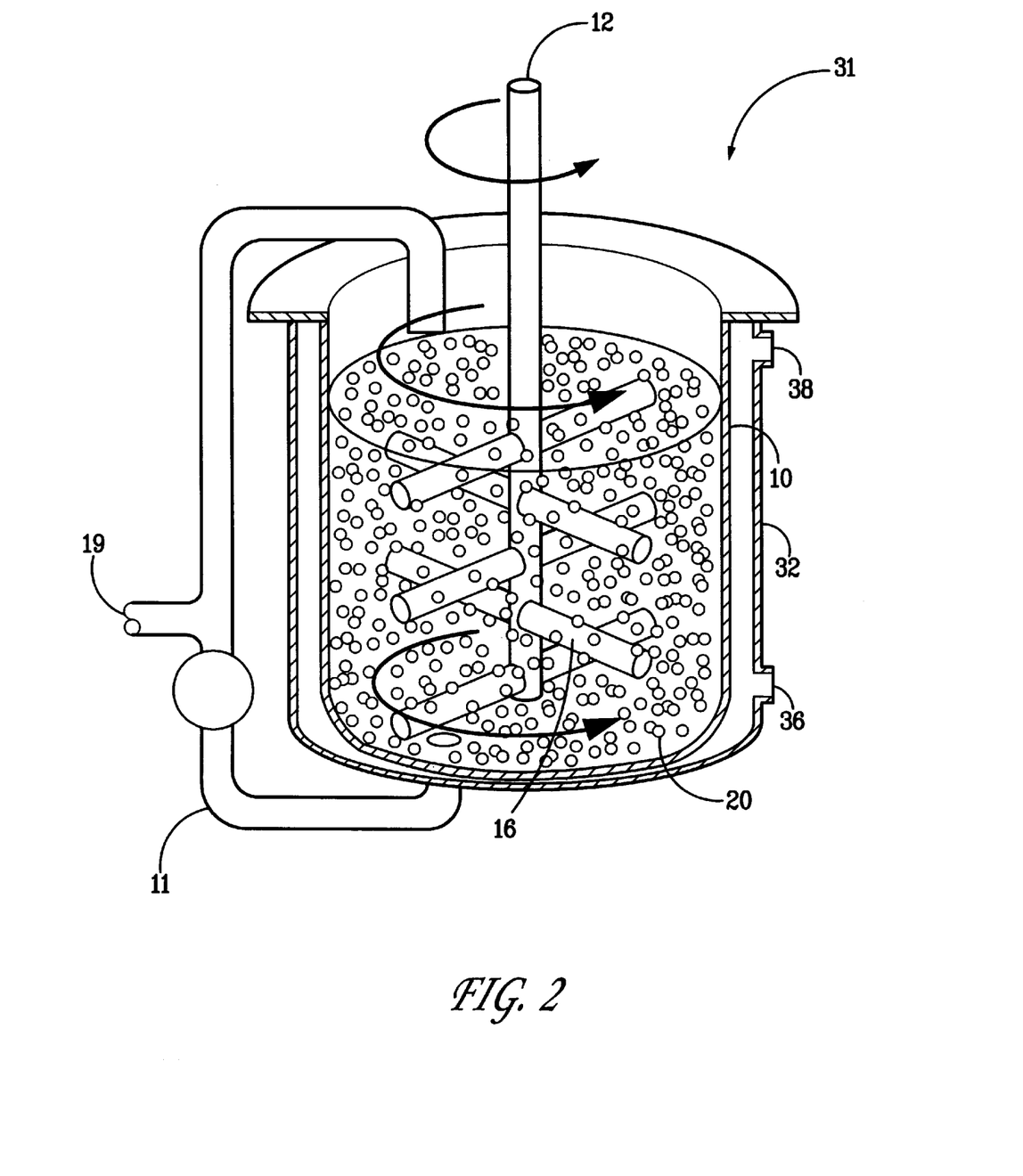
FIG. 2 is a cross-sectional side view of a batch attritor utilized in an alternative embodiment of the invention.

The thixotropic grout of the invention must be constantly kept in motion to remain fluid. After the wet grout ingredients are mixed in mixer 70, the grout mix is transferred, via low pressure hose 72 and circulation pump 71, from mixer 70 to agitation tank 40. Grout mix is cooled and constantly stirred (e.g. at approximately 60 rpm) in agitation tank 40. Agitation tank 40 may be fashioned from #316 stainless steel, and preferably is capable of variable stirring speeds with motor-driven paddles. Like the "batch" attritor tank 10 used for simultaneous wet pulverization and mixing, agitation tank 40 is surrounded with a cooling jacket (not shown); tank cooling for both the agitation tank 40 and the attritor tank 10 is accomplished by circulating water at 42±5 degrees Fahrenheit through their respective cooling jackets.

FIG. 2 depicts a "batch" attritor 31 usable for performing wet pulverization. Batch attritor 31 operates similarly and on the same general principles as a continuous feed attritor, with the difference between the two types evident from their titles. Like high speed attritor 30, a batch attritor 31 includes pulverization media 20 contained within tank 10 and disposed around a plurality of cross arms 16 (preferably tungsten carbide). Each cross arm 16 is attached to and driven by vertical shaft 12.

When wet pulverization is performed in a "batch" attritor, tank 10 must be surrounded by cooling jacket 32. Cooling jacket 32 defines a space envelope 34 around tank 10. Chilled water is circulated through envelope 34 via cooling water inlet 36 and cooling water outlet 38, to maintain a reduced temperature of the grout mixture to prevent premature setting of the grout. Also featured are recirculation line 11, recirculation pump, and discharge 19.

Combined reference is made to all the figures. A grout "wet" pulverization system according to the present invention utilizes essentially the same components as the dry pulverization system. For wet pulverization, colloidal mixer 70 is not required, since pulverization and mixing are concurrently accomplished within the batch attritor 31. Attritor 31 instead is used in lieu of a mixer and in direct conjunction with an agitation tank 40.

An important aspect of quality control during the practice of the invention is the assessment of grout particle size and percent distribution thereof during pulverization/mixing and injection. Grout particle size and percent distribution by size preferably is determined periodically (e.g. every 15 minutes) using a laser particle size analyzer 42, such as the Malvern Model 3200E MASTERSIZER® laser particle size analyzer from Malvern Instruments, Ltd. A particle size analyzer can be used to assure that maximum grout particle size is within the ultrafine range (90%<8 $\mu$m for the wet process and 90%<5 $\mu$m for the dry process) prior to grout injection. Grout mix samples for particle size analysis are removed from the wet system during pulverization/mixing via attritor sampling port 48, and from sample port as during injection. If the dry pulverization method is used, samples are taken from sample port 85.

In either the wet pulverization or dry pulverization method, the completed wet grout mixture is pumped by high-pressure circulation pump 74 through high-pressure hose 75 to a desired or appropriate injection system. An injection system will include the various valves, gauges, and fittings known in the art for grout injection. A suitable injection system is depicted in FIG. 4. Wet grout mix is pumped under pressure to an injection tee 76, where a portion of the mix is directed through injector 78 and into injection bore 80. As illustrated in FIG. 4, injector 78 and bore 80 are disposed through rock or concrete slab 82 overlying the stratum to be sealed. The passage between bore 80 and injector 78 is sealed with injection bore packer 83.

Injection tee 76 may contain pressure-relief and other desirable elements and features, such as a second sampling port 85, and also allows non-injected mix to be returned to agitator 40 via circulation line 86. Pressure in injector 78 may be monitored by a pressure transducer 88 disposed therein.

Accordingly, the wet grout mixture may be pumped under pressure from agitator 40, through hose 75 to injector tee 76, then under high pressure through injector 78 into the formation to be sealed. Excess grout is recirculated to agitator 40 for re-use. Pressure transducer 88 may be engaged to monitor pressure and actuate safety and shut-off valves.

The grout mixes pulverized in attritor 30 (dry pulverization) or 31 (wet pulverization) comprise cement, superplasticizer and pozzolanic material. Each constituent of the grout mix to be pulverized in the appropriate attritor 30 or 31 is added in the prescribed proportions to the attritor. In the case of wet pulverization/mixing, the measured amount of water to be added to the mix is introduced first to the attritor and circulated continuously, followed by the superplasticizer, pozzolan, and Portland cement.

The specific types and relative amounts of the grout mix constituents are of paramount importance in the successful practice of the invention, as is the achievement of sufficiently small particle size. Attempting to obtain an extremely low maximum particle dimension requires relatively longer pulverization times and is limited by the setting time of the wetted mixture, since finer materials react faster. Efforts to treat the grout mixture with admixtures or extra water to delay setting, however, can contribute to undesirable shrinkage and bleed, and jeopardize the mechanical properties of the hardened grout, most particularly the unconfined, uniaxial, compressive strength.

An illustrative problem in the present art is the challenge of preparing, using simultaneous pulverization and mixing, of cement-based grouts with a maximum particle size of only 4 $\mu$m, composed of conventionally ground cements and silica fume or fly ash as pozzolanic materials, and incorporating superplasticizers. Increasing the water-to-cementitious materials ratio (W/CM), or the superplasticizer content, increases the fluidity of the grouts and increases the time the grout remains injectable. But prior art ultrafine grouting methodologies generally specify W/CM ratios in excess of 1.0/1. Such high water and superplasticizer contents are required to decrease the viscosity of the mixes and to delay setting sufficiently to allow wet pulverization and/or injection of the mixes for adequate periods of time.

A need to increase the W/CM ratio to greater than 1.0/1, and grout with maximum particle size of, say, less than 4 $\mu$m conflicts with other desirable grout properties. The mechanical properties of grouts prepared with such high contents of water and superplasticizer are not always certain, but it is clear that the use of higher water content in a grout tends to decrease the compressive strength and increase the permeability. Both effects are undesirable.

Specifically, grout mixtures composed of common Portland cement (American Society for Testing and Material (ASTM) Type 5), silica fume or fly ash, superplasticizer (2%<wt. %<8%), and W/CM ratio in excess of 0.9/1, with 90% of the particles smaller than 4 $\mu$m, are found to have unacceptably low density (between 1.14 and 1.47 g/cm$^3$) and high permeability, as well as unacceptably low unconfined compressive strength (less than 18 MPa) (2600 psi) as result of the higher water content. "Bleed" (separation of water when the grout "sets" or hardens) can also occur. Increased amounts of superplasticizer can result in increased detrimental shrinkage when the grout hardens.

Grinding efficiency can be controlled by varying the rotational speed of the attritor and by using different pulverization media. It is determined that for wet pulverization there is an optimum pulverization time beyond which any increase in grinding time does not significantly decrease particle size.

Thus, the present invention consists in part of a determination that using the wet pulverization process, it is not feasible (particularly within economic limits) to produce grout mixes with a maximum particle dimension of 4 $\mu$m without overly increasing the W/CM ratio and plasticizer content and consequently jeopardizing the final properties (permeability and strength) of the hardened grout. Further, the component proportions and pulverization conditions yielding a grout paste with 90% of the particles smaller than 8 $\mu$m (wet pulverization) or less than 5 $\mu$m (dry pulverization), with reduced water and superplasticizer contents, and commensurate with economics, has been determined. Grout mixes with such particle size limits are adequate to seal microfractures in most commonly encountered subterranean materials. The invention accommodates the ultrafine particle size required, while meeting other performance criteria (compressive strength, low shrinkage, zero "bleed" and extremely low permeability).

Principal workability and performance criteria satisfied by the grout composition of the invention, and believed unsatisfied by compositions known in the art, include: the reduction of agglomeration (to less than 5% of grout mass) for at least one hour subsequent to pulverization; acceptable rheology (<0.040 Pa.s at shear rate=1208/s) (necessary for wet grout working, transportation, and penetration); initial Vicat set, (at 80° F.) between two and about six hours subsequent to mixing; zero bleed; unconfined uniaxial compressive strength greater than at least 40 MPa; permeability of $10^{-9}$ darcy or less; and less than 1% linear shrinkage.

A preferred embodiment of the inventive composition is a grout mix incorporating ASTM Type 5 Portland cement, pumice and superplasticizer. Specifically, the preferred composition is: 45 (±3) weight percent ASTM Type 5 sulfate-resistant Portland cement; 55 (±3) weight percent pumice; and 1.0 (±1) weight percent superplasticizer, such as DOWELL-SCHLUMBERGER D-65® (a sulfonated sodium naphthalene formaldehyde condensate) or acceptable alternative. The pozzolanic pumice preferably is −325 mesh pumice (available from Hess Pumice Company of Malad, Id.). This preferred dry grout mix formula is mixed with ordinary tap water, preferably between approximately 0.4 0/1 to 0.6 0/1, inclusive, and most preferably 0.5/1. In another preferred embodiment, mentioned above, using ASTM Type 3 Portland cement, 30% to 60% ASTM Type 3 Portland Cement and 40% to 70%, −325 mesh pumice mixed with potable water containing 1.2 to 2.0 weight percent (of the cement and pozzolan) superplasticizer.

It is known in general that the presence of a superplasticizer in a grout mix enables the use of a lower W/CM ratio which desirably increases the density and durability of the resulting hardened grout while effectively elimination agglomeration, retaining good workability and reducing bleed. The setting time is also increased somewhat. However, the intense grinding process employed to produce the ultrafine particle sizes herein most probably severs a significant portion of the long chain molecules that make up the superplasticizer and thereby reduces the effectiveness of the material by an undetermined amount.

The inventive compositions preferably include ASTM Type 5 Portland cement or ASTM Type 3 Portland cement as a principal component. Other common Portland cements (ASTM Types 1, 2 and 4) may be suitable in certain applications. However, ASTM Type 2 may generate undesirably high heat of hydration. ASTM Type 5 is preferred for its overall strength, hardening time, and sulfate resistance. Sulfate resistance is indicated in subsurface grouting in crystalline rocks where groundwater may contain cement-attacking sulfates. For applications in which sulfate resistance is not required, ASTM Type 3 may be used according to the proportions disclosed.

As previously discussed, the proportional amounts of the component ingredients of grout can dramatically impact the physio-mechanical properties of both the wet mix and the hardened grout. The preferred embodiment of the inventive composition is determined best to meet the principal criteria set forth above. Generally, if the proportional amount of pozzolanic material (e.g. pumice) exceeds or falls short of that specified, the resulting mix may set too quickly to be workable for a sufficient time, or may be too porous, permeable, or weak when hardened. Similarly, excessive quantities of superplasticizer will cause excessive shrinkage, while insufficient plasticizer will unacceptably increase plastic viscosity and shorten set time. Excessive W/CM ratios unacceptably reduce strength, increase permeability and may result in "bleed".

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

I claim:

1. An ultrafine cementitious grout composition consisting essentially of:
   from about 30 wt. % to about 70 wt. % Portland cement;
   from about 30 wt. % to about 70 wt. % pumice; and
   from 1.2 wt. % to about 5 wt. % superplasticizer;
   wherein the Portland cement, the pumice and superplasticizer all having particle sizes such that approximately 90% of the particles are less than 17 μm in diameter and the average particle size is less than 8 μm in diameter.

2. The composition of claim 1 wherein the pumice contains at least 70% $SiO_2$.

3. The composition of claim 1 wherein the superplasticizer is a sulfonated salt of napthalyene formaldehyde.

4. The composition of claim 1 wherein the Portland Cement is a Type 3, Portland cement.

5. The composition of claim 1 further consisting essentially of water in an amount sufficient to provide the composition with a water/(Portland cement+pumice+superplasticizer) ratio of about 0.40 to 1.00.

6. An ultrafine cementitious grout composition consisting essentially of:
   from about 30 wt. % to about 70 wt. % Portland cement;
   from about 30 wt. % to about 70 wt. % pumice; and
   from 1.2 wt. % to about 5 wt. % superplasticizer;
   wherein the Portland cement, the pumice and superplasticizer all having particle sizes such that approximately 90% of the particles are less than 8 μm in diameter and the average particle size is less than 4 μm in diameter.

7. The composition of claim 6 wherein the pumice contains at least 70% $SiO_2$.

8. The composition of claim 6 wherein the superplasticizer is a sulfonated salt of napthalyene formaldehyde.

9. The composition of claim 6 wherein the Portland Cement is a Type 3, Portland cement.

10. The composition of claim 6, further consisting essentially of water in an amount sufficient to provide the composition with a water/(Portland cement+pumice+superplasticizer) ratio of about 0.40 to 1.00.

11. An ultrafine cementitious grout composition consisting essentially of:
    from about 30 wt. % to about 70 wt. % Portland cement;
    from about 30 wt. % to about 70 wt. % pumice; and
    from 1.2 wt. % to about 5 wt. % superplasticizer;
    wherein the Portland cement, the pumice and superplasticizer all having particle sizes such that approximately 90% of the particles are less than 5 μm in diameter and the average particle size is approximately 2.5 μm in diameter.

12. The composition of claim 11 wherein the pumice contains at least 70% $SiO_2$.

13. The composition of claim 11 wherein the superplasticizer is a sulfonated salt of napthalyene formaldehyde.

14. The composition of claim 11 wherein the Portland Cement is a Type 3 Portland cement.

15. The composition of claim 11, further consisting essentially of water in an amount sufficient to provide the composition with a water/(Portland cement+pumice+superplasticizer) ratio of about 0.40 to 1.00.

16. An ultrafine cementitious grout product made by a process comprising:
    combining from about 30 wt. % to about 60 wt. % Portland cement with from about 40 wt. % to about 70 wt. % pumice containing at least 70% amorphous silicon dioxide, placing the combined components in a high speed attritor grinding means containing zirconium silicate grinding media having a size approximately 2 mm in diameter, grinding the combined components to form pulverized dry grout, conveying the pulverized dry grout from the grinding means to an air classifier means having a first output which allows only particles of a size correlating to 90% of which are less than 5 $\mu$m in diameter and an average size of about 2.5 $\mu$m or less to pass and a second output for particles having a larger size than those passed by the first output, conveying the particles from the second output back into the grinding means, segregating the particles from the first output wherein the particles from the first output form dry ultrafine cemetitious grout product, and upon use, combining the dry ultrafine cementitious grout product with mixing water containing superplasticizer in the amount of from about 1.2 to about 5 wt. % of the cement and pumice.

* * * * *